Patented Dec. 9, 1952

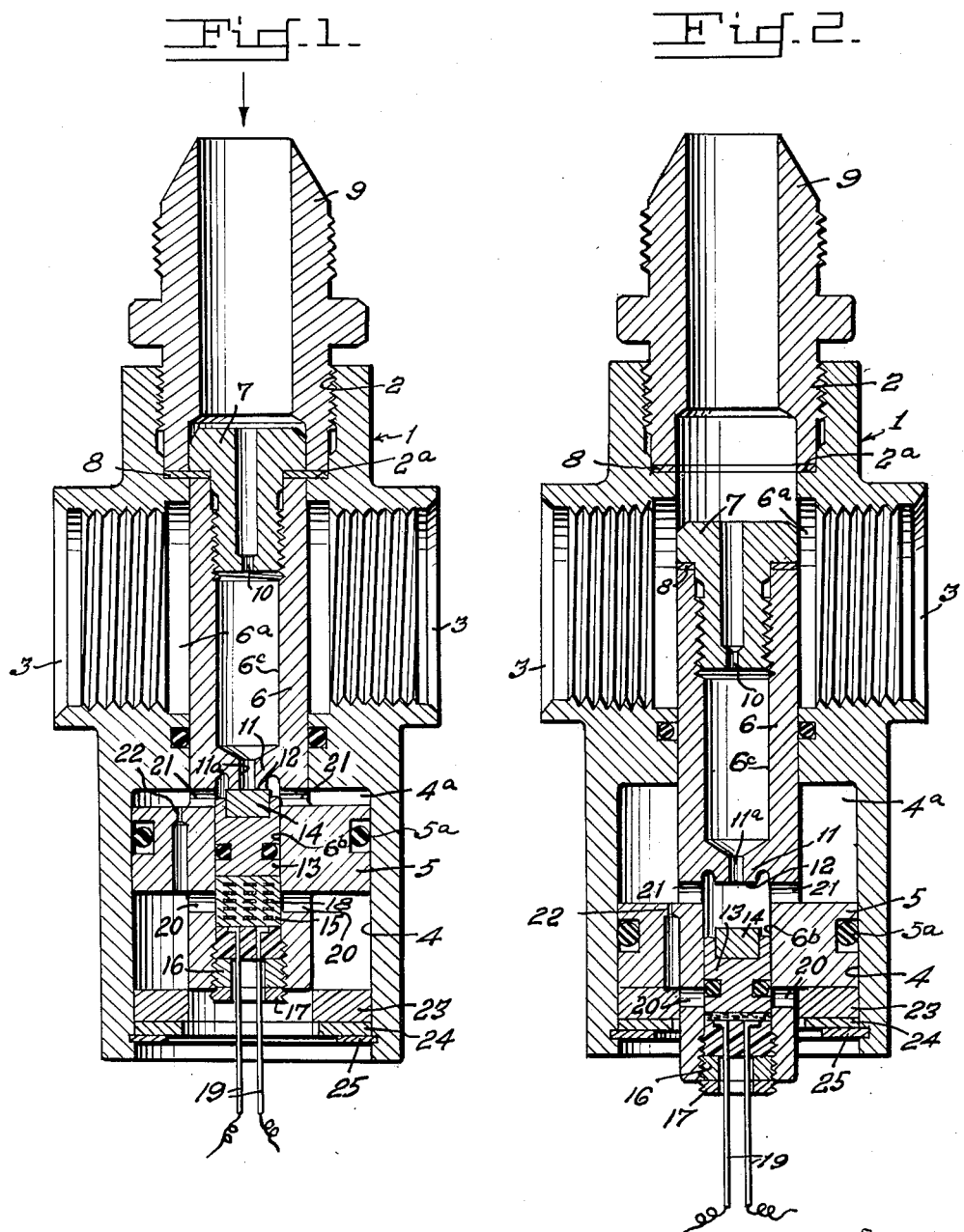

2,620,815

UNITED STATES PATENT OFFICE 2,620,815

VALVE ACTUATED BY FUSIBLE PLUG

Harry J. Margraf, Altadena, and William F. MacGlashan, Jr., Alhambra, Calif., assignors to the United States of America as represented by the Secretary of the Army Application August 1, 1950, Serial No. 177,054

7 Claims. (Cl. 137—70)

This invention relates to improvements in pressure relief valves and more particularly to a pressure relief valve which is actuated by fusible means.

An object of this invention is a pressure relief valve which is compact and pilot operated for use in controlling high pressure as experienced in jet propulsion devices.

The specific nature of the invention as well as other objects and advantages thereof will clearly appear from the following description and drawing in which:

Fig. 1 is a longitudinal sectional view of the valve in closed position.

Fig. 2 is a longitudinal sectional view of the valve in open position.

Referring now to the drawings by characters of reference there is shown a valve including a body 1 having an intake port 2 at one end, diametrically disposed discharge ports 3 intermediate its ends and a chamber 4 at the end opposite from the intake port 2. The chamber 4 receives a piston 5 provided with sealing means 5a. The piston 5 is integral with a hollow stem 6 which extends through a control bore 6a of the body 1 communicating between the chamber 4 and the intake port 2. The extended end of the stem 6 adjacent the inlet port 2 screw-threadedly receives a shear screw 7 which coacts with the extremity of the stem 6 to clamp a shear ring 8 therebetween. The outer periphery of the shear ring rests on a shoulder 2a formed within the intake port 2 and is held there by the inner end of a nipple 9 which is threaded into the intake port 2. In the shear screw 7 is a restricted passage 10 which communicates with the interior of the hollow stem 6. The hollow stem is provided with communicating longitudinal bores 6c and 6b separated by a dividing wall 11 having a central port 11a surrounded by a pilot valve seat 12 formed integral therewith and facing in the direction of piston 5. The bore 6b continues through the piston 5 and receives a plunger 13 which carries a pilot valve 14 adapted to engage and seal the valve seat 12. The plunger 13 is backed by a fusible plug 15 which rests on a base 16 and is held against the plunger 13 by means of a threaded plug 17 as shown in the drawings. Within the fusible plug is molded a resistance wire 18 which is connected to lead wires 19 extending from the fusible plug 15 and out of the chamber 4. Lateral ports 20 are provided in the stem 6 adjacent the under side of the piston through which the material comprising the fusible plug 15 may flow when the resistance wire 18 is heated. Other lateral ports 21 are provided in the stem 6 intermediate the top side of the piston and the dividing wall 11 in communication with the space formed between the inner end 4a of the chamber 4 and the piston 5 and the bore 6b. The open end of chamber 4 is provided with a yieldable seal washer 23 which rests on a backing ring 24 held in place by means of a snap ring 25. A bleeder port 22 is provided in piston 5 to prevent the buildup of pressure against the piston in the event of pilot valve leakage. When the valve is open, the seal washer 23 seals the bleeder port 22.

In operation, when the valve is to be opened, the resistance wire 18 is heated by the application of an electrical power source to the leads 19, melting the fusible plug 15 and permitting the pressure that exists in the system communicating with the nipple 9 to be applied to the piston 5. The shear ring 8 is designed to withstand a predetermined pressure applied to the area of the shear screw 7, but is unable to withstand the pressure applied to the entire area of the piston 5. Thus, when the fusible plug is melted and the pilot valve opens, the fluid pressure on piston 5 causes the shear ring 8 to shear and the piston to move downward until it is stopped by the seal washer 23. The travel of the piston is sufficient to move the upper end of the stem 6 clear of the intake port, thereby permitting free flow between the intake port and the discharge ports.

We claim:

1. A pressure relief device comprising a cross-shaped housing, a vertical bore in said housing, outlet ports intersecting said bore intermediate its ends, one end of said bore provided with a chamber, the opposite end comprising an inlet port having a shoulder formed therein, a shear ring positioned on said shoulder, said shear ring being retained on said shoulder by means of a nipple threadedly affixed to said inlet port, a hollow stem in said bore having one end affixed to said ring, said stem obstructing fluid flow to said outlet ports, a piston mounted on the opposite end of said stem and slidable in said chamber, fusible means in said stem operable when fused to admit fluid pressure to said piston and cause said stem to shear the ring, said piston moving the stem out of said inlet port to permit fluid flow from said inlet port to said outlet ports.

2. A valve casing provided with a bore intersecting outlet ports, one end of said bore comprising an inlet port, a shear washer supported on a shoulder within said inlet port and retained thereon by means of a nipple within said inlet port, a hollow stem having one end positioned in said inlet port and affixed to said washer by means of a bored screw threaded into said one end, a perforated wall comprising a valve seat formed within said stem intermediate its ends, a valve normally in contact with said seat and releasably supported by a fusible material, a piston slidable in said casing, said piston being carried by said stem adjacent its other end, fluid outlet ports formed in the walls of said stem adjacent the end of the piston which faces said inlet port, orifices formed in the walls of said stem adjacent the other end of said piston, said material when heated flowing through said orifices to permit the fluid pressure in said inlet port to act on said piston to cause shearing of said ring and withdrawal of said stem from the inlet port.

3. A fusible plug operated valve comprising an elongated tubular housing having an inlet on one end, a pilot valve chamber on the opposed end and a pair of diametrically opposed outlets through the side wall of said housing intermediate said inlet and said pilot valve chamber, a co-axial elongated stem received in said housing movable in the direction of fluid flow from a first position blocking said discharge outlets to a second position uncovering said outlets, a shear ring secured to said housing and said stem and adapted to maintain said stem in outlet blocking position, said stem having an axial bore extending throughout its length, said axial bore having a restriction intermediate the ends of said stem to form a pilot valve seat, a piston surrounding and integral with said stem and peripherally engaging the side walls of said valve chamber, a plunger in said stem bore downstream of said restriction adapted to seat against said pilot valve seat, means including a fusible plug secured within said stem bore and operated to hold said plunger in position against said pilot valve seat, said stem having diametrically opposed transverse openings connecting said bore downstream of said restriction with said valve chamber on the upstream side of said piston when said pilot valve is opened, and means adapted to melt said fusible plug to cause said plunger to leave said pilot valve seat whereby fluid pressure exerted on the face of said piston fractures said shear ring to cause said stem to move into outlet uncovering position.

4. The combination in claim 3 including means supported on the wall of said chamber downstream of said piston to limit the movement of said stem in the direction of flow.

5. The combination in claim 3 including a resistance wire molded in said fusible plug, and means to apply electric current to said wire to melt said plug.

6. The combination in claim 3 including a shoulder in said inlet adapted to form a reduced bore to receive said stem, said shear ring positioned on said shoulder and engaging the end wall of said stem, a shear screw threaded into the bore of said stem having an enlarged head to clamp said shear ring between it and the end wall of said stem, said shear screw having a restricted bore axially alined with the bore of said stem.

7. A valve comprising an elongated tubular housing including an inwardly directed flange dividing said housing into a first upper chamber and a second lower chamber, said housing having a central fluid inlet into said first chamber and diametrically opposed outlets intermediate said inlet and said flange, a valve stem extending from a point adjacent said inlet through said first chamber and said flange and into said second chamber and movable in said housing in the direction of fluid flow from a first position closing said outlets to second position uncovering said outlets, said stem having an elongated axial bore communicating with said fluid inlet and including a restriction upstream of said second chamber forming a pilot valve seat to control the flow of fluid into said second chamber, a shear ring supported on said housing and secured to said stem to releasably maintain said stem in outlet closing position, a cylindrical piston surrounding and integral with said stem and peripherally engaging the wall of said second chamber and forming with said flange and said stem a pressure chamber, a plunger slidable in said stem bore downstream of said restriction adapted to engage and seal against said pilot valve seat, means including a fusible plug secured in said stem bore and bearing against said plunger to releasably maintain said plunger in pilot valve closing position, and means to melt said fusible plug to release said plunger for sliding downwardly in said stem bore to open said pilot valve whereby fluid pressure exerted against the large area of said piston fractures said shear ring to thereby cause said stem to move into outlet uncovering position.

HARRY J. MARGRAF.
WILLIAM F. MacGLASHAN, Jr.

REFERENCES CITED

The following references are of record in the file of this patent:

UNITED STATES PATENTS

| Number | Name | Date |
|---|---|---|
| 685,931 | Nethery | Nov. 5, 1901 |
| 824,935 | Jenczewsky | July 3, 1906 |
| 1,794,191 | Lovekin | Feb. 24, 1931 |
| 2,115,371 | Mossberg | Apr. 26, 1938 |
| 2,405,439 | Lubbock et al. | Aug. 6, 1946 |